Aug. 22, 1950 E. A. FREDRICKSON ET AL 2,520,092
VALVE
Filed May 15, 1944 2 Sheets-Sheet 2
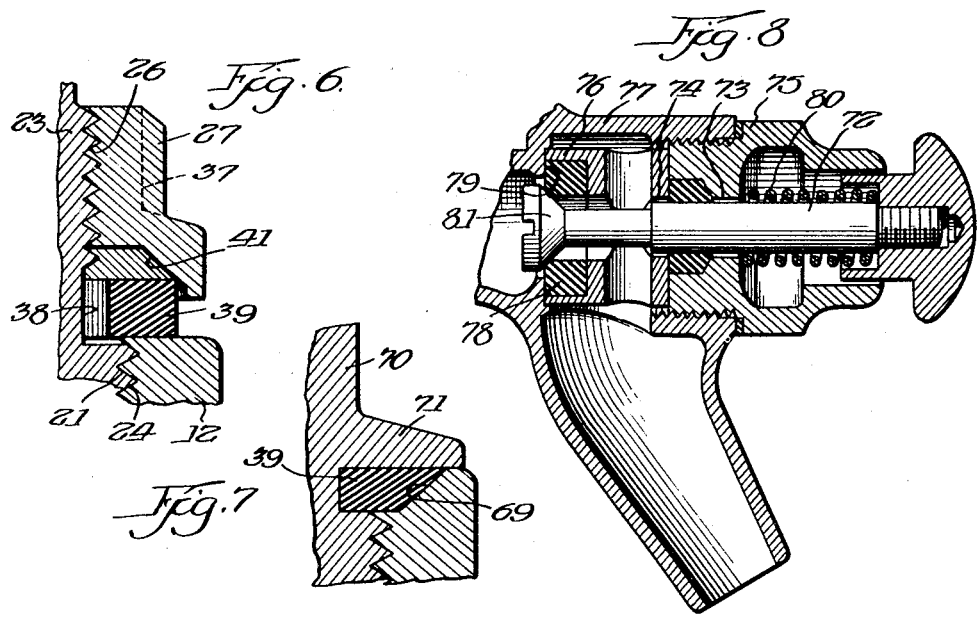
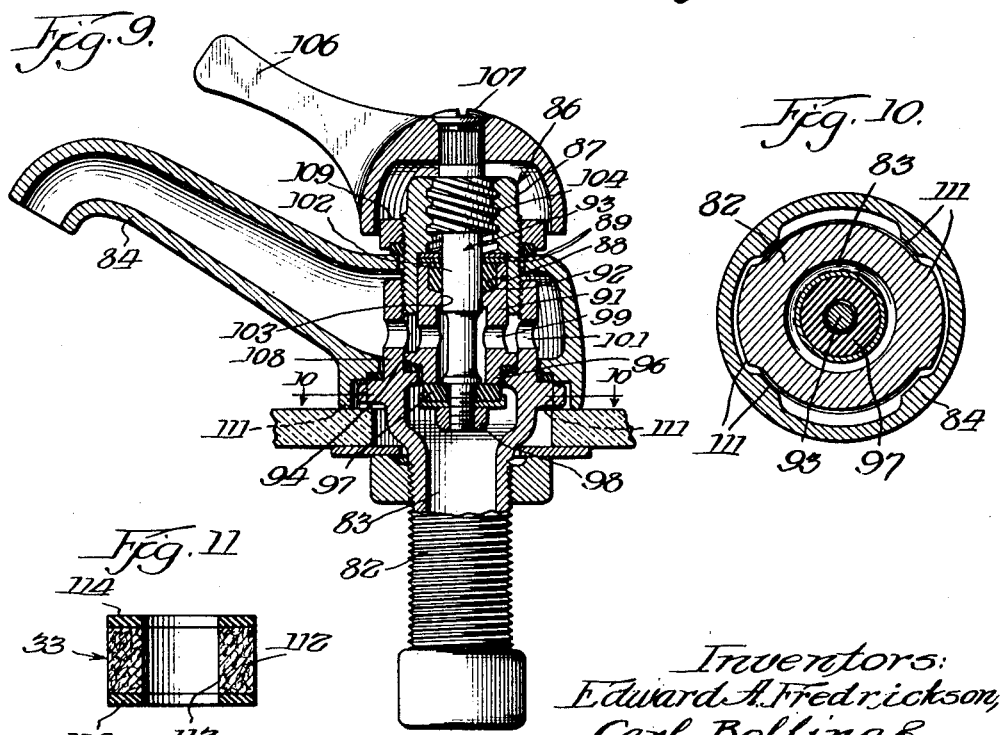
Inventors:
Edward A. Fredrickson,
Carl Bolling &
Roy H. Zintil
By Joseph O. Lange Atty.

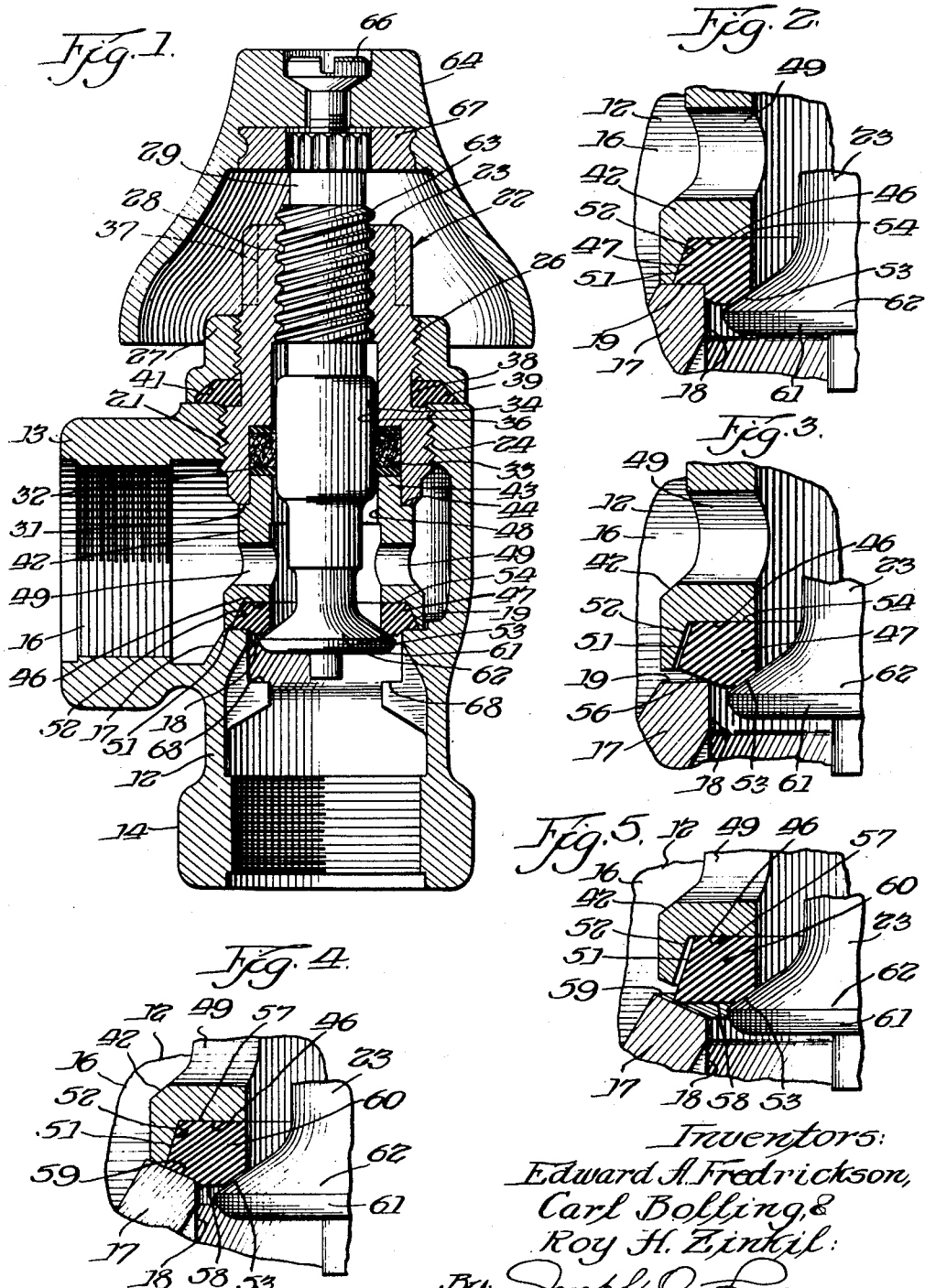

Patented Aug. 22, 1950

2,520,092

UNITED STATES PATENT OFFICE 2,520,092

VALVE

Edward A. Fredrickson and Carl Bolling, Chicago, and Roy H. Zinkil, Oak Park, Ill., assignors to Crane Co., Chicago, Ill., a corporation of Illinois Application May 15, 1944, Serial No. 535,728

5 Claims. (Cl. 251—156)

This invention relates to valves and is more particularly concerned with improvements in valves whereby the cost of manufacture may be substantially reduced and the service life of the valve may be prolonged.

It is a further object of this invention to reduce the frictional resistance offered by the packing material in the operation of the valve stem in opening and closing the valve. This result is accomplished by providing a novel packing ring formed of felt having its opposing faces coated with a layer of rubber, neoprene, or like material and compressed within a packing chamber to a predetermined thickness. As the frictional resistance offered by the packing ring to the operation of the stem is almost negligible, the service life of the packing ring is thereby greatly prolonged and the manipulation of the valve is facilitated.

This invention further contemplates the arrangement of the packing chamber between the valve stem actuating mechanism and the line fluid being controlled to readily permit applications of lubricant to said stem actuating mechanism and without contaminating the line fluid being controlled.

Another object of this invention is to provide an improved renewable seat ring and novel mounting means for same to prolong the useful life of the seat ring and to facilitate its removal and replacement when necessary. The type of seat ring contemplated is formed of materials having plasticity or resiliency and selected for the service required or the kind of line fluid to be controlled. Several thermoplastic materials now available, such as nylon, Saran, etc., and some types of synthetic rubber have proved to be suitable for use in seat ring constructions of the form employed in the present valve. Seat rings formed of lead alloys have also proved satisfactory for some types of service.

A further object of this invention is to provide a valve in which the seat and packing ring are embodied in a valve stem assembly which may readily be disassembled from the valve body as a unit for renewing the seat and packing ring. In the latter connection, one of the more important objects lies in the provision of a construction in which the valve packing of our device is simultaneously compressed to fixed position with relation to the valve seat and likewise relative to the valve seat and the gasket joint as hereinafter described in detail upon assembly with the valve stem unit in the casing.

It is another object of this invention to provide a valve in which the renewable seat and packing ring are both secured in a valve stem assembly under a fixed predetermined compression load. It has heretofore been common practice to provide adjustable means for applying a variable compression load on seat rings and packing material. By avoiding this practice in the current contribution to the art, it has been possible to greatly prolong the service life of valve seats and packing rings and to decrease the amount of force required in operating the valve.

A further object of this invention resides in the provision of a novel self-aligning valve stem assembly in which the several parts are held in alignment by means of a valve stem mounted for rotational and axial movement therein, to facilitate mounting of the stem assembly in proper seating alignment with a valve body and to permit movement of the valve stem without binding and with neligible frictional resistance.

Another object of this invention is to provide a valve seat holder on the valve stem assembly and having an annular converging recess formed therein to receive a resilient valve seat which is expanded into leakproof engagement within the converging recess by the inward movement of the valve seat holder against a wall of the port opening in a valve body during mounting of the valve stem assembly in the valve body. The valve seat thus serves effectively as a sealing gasket between the valve seat holder and the wall of the body port opening. The valve seat holder is journally mounted on the valve stem assembly to permit compression of the valve seat without rotational movement relative to the wall of the body port, to thereby eliminate the possibility of injury to or distortion of the valve seat.

Another object of this invention is to provide improved gasket sealing means between the valve stem assembly and the valve body.

This invention embodies other novel features, details of construction and arrangement of parts which are hereinafter set forth in the specification and claims and illustrated in the accompanying drawings, forming part thereof, wherein:

Fig. 1 is a vertical sectional view showing a valve embodying features of this invention.

Fig. 2 is an enlarged fragmentary view showing a valve seat as it appears after being expanded into the valve seat holder.

Fig. 3 is a view similar to Fig. 2, in which the valve seat is shown prior to being expanded into the valve seat holder.

Fig. 4 is an enlarged fragmentary view showing a modified form valve seat and mounting therefor in final assembled relation.

Fig. 5 is a view similar to Fig. 4, showing the valve seat as it appears prior to being compressed into the valve seat holder.

Fig. 6 is an enlarged fragmentary view showing the gasket sealing means for the valve stem assembly and the valve body prior to sealing engagement.

Fig. 7 is an enlarged fragmentary view showing a modified form of gasket sealing means.

Fig. 8 is a vertical sectional view showing a modified form of the valve illustrated in Fig. 1.

Fig. 9 is a vertical sectional view showing another modified form of valve.

Fig. 10 is a sectional view taken along the line 10—10 of Fig. 9.

Fig. 11 is a vertical sectional detail view showing an improved packing ring for use in valves.

Referring now to the drawings for a better understanding of this invention and more particularly to Figs. 1, 2 and 3 therein, a valve embodying features of this invention is shown comprising a body 12 having pipe connecting ends 13 and 14 and a passage 16 therethrough. A wall or diaphragm 17 having an annular port opening 18 therethrough is formed on the body within the passage 16 and provided with a sealing shoulder 19. A threaded opening 21 is provided in the body and in axial alignment with the port opening 18 thereof to receive a valve stem assembly 22.

The valve stem assembly 22 comprises a centerpiece 23 which is externally threaded at 24 and 26 for engagement with the valve body 12 and the gasket retainer nut 27, respectively, and is also threaded internally at 28 to receive a valve stem 29. The inner end of the centerpiece is recessed inwardly from a thrust shoulder 31 to form a packing chamber 32 adapted to receive a packing ring 33. Between the threads 28 and the packing chamber 32 the centerpiece is provided with a bearing surface 34 for close sliding engagement with a bearing surface 36 formed on the valve stem 29. Suitable flats 37 are formed on the outer end of the centerpiece for engagement by a wrench in assembly, and an undercut portion 38 is provided at the inner end of the threads 26 to receive and engage a gasket 39.

The gasket retainer nut 27 is formed with an inwardly converging recess 41 which acts, upon assembly of the valve, to change the gasket 39 from the form shown in Fig. 6 to the form illustrated in Fig. 1 for sealing engagement in the undercut portion 38. The undercut portion thus provides a true sealing surface for the gasket and also prevents the accidental displacement of same when the valve is disassembled in order to renew the seat ring or packing ring.

A sleeve 42 is mounted between the valve body sealing shoulder 19 and the centerpiece 23 and is formed with a gland portion 43 and an abutment shoulder 44 on its one end and with a converging recess 46 on its other end to receive a resilient seat ring 47. The sleeve is also provided with a bearing surface 48 to receive the stem bearing 36 and with a plurality of flow apertures 49.

The seat ring 47 is formed with a frusto-conical outer wall 51 for a free or loose fit in the complemental wall 52 of the converging recess 46, as shown in Fig. 3, and is compressed between the sealing shoulder 19 and the bottom of the recess in assembly to expand the diameter of the wall 51 until it tightly engages and seals the wall 52, as shown in Fig. 2, and without distorting the seating face 53 from its true annular shape. In Fig. 3 it will be observed that the seat ring face 54 is parallel with the sealing shoulder 19, and that the face 56 is disposed at substantially a 90° angle to the wall 51. In the modified form shown in Figs. 4 and 5, the walls 57 and 58 of the seat ring 59 are parallel, and the sealing shoulder 59 forms an inwardly converging seat for the seat ring. It will be noted that the provision of the tapered wall 51 insures proper mounting of the seat ring to present the seat 53 for contact by a closure member.

The valve stem 29 is formed with a closure portion 61 having a frusto-conical seating face 62 for sealing engagement with the seating face 53 of the seat ring, and is threaded at 63 for engagement with the threads 28 formed in the centerpiece. A suitable handwheel 64 is secured to the outer end of the stem by means of a screw 66 and is held against relative rotational movement thereon by means of the internally serrated insert 67. Stop shoulders 68 are preferably provided on the valve body to limit the opening movement of the valve stem.

Fig. 7 shows a modified form of mounting for the gasket 39, in which the valve body is formed with a converging recess 69, and an annular flange 71 is formed on the centerpiece 70 to replace the gasket nut 27.

Fig. 8 shows a modified form of this invention in which a faucet is opened and closed by a reciprocable movement of a valve stem 72 guided within the bearings 73 and 74 provided in a centerpiece 75 and sleeve 76, respectively. The centerpiece is threaded into a body 77 to engage the sleeve 76 and seat ring 78 against a body seating surface 79. A compression spring 80 is employed to normally hold a tapered valve closure member 81 against the seat ring 78.

Referring now to Figs. 9 and 10, another modified form of this invention is shown embodied in a faucet construction comprising a valve body 82 having a passage 83, a spout 84, and a stem assembly 86. A centerpiece 87 is threaded into the body and is recessed at 88 to receive washers 89 and one end of a sleeve 91 to form a packing chamber 92 for a valve stem 93. A port seat 94 is formed on the body to engage the inner end of the sleeve 91. The sleeve is formed with an annular seat 96 for engagement by a valve disc 97 which is secured to the valve stem 93 by a nut 98 and is held against rotational movement relative thereto by coacting flat surfaces (not shown) formed on the stem and disc. Apertures 99 and 101 are formed in the sleeve 91 and body 82, respectively, to connect the passage 83 with the spout 84. The valve stem is formed with a journal portion 102 for sliding aligning engagement in a bearing surface 103 formed in the sleeve 91, and has its outer end in threaded engagement with the centerpiece at 104. A suitable actuating lever 106 is secured to the outer end of the stem by means of a screw 107. The spout 84 is secured against a shoulder 108 provided on the valve body by means of a nut 109 threaded onto the centerpiece, and is held against rotational movement relatively thereto by suitable coacting lugs 111.

Referring now to Fig. 11 in the drawings, the packing ring 33 is shown comprising an annular body portion 112 having a stem opening 113 slightly smaller than the diameter of the stem to be seated and faced with a suitable resilient material 114. In the use of this type of packing ring for water service, satisfactory results have been obtained by forming the said body portion of S. A. E. No. F-3 Back Check waterproofed felt, manufactured to meet the A. S. T. M. specification D 461-40, and faced with neoprene as at 114. The type of packing ring thus shown and described effectively seals the valve stem when compressed to approximately 80% of its normal thickness and due to its structure offers little frictional resistance to the valve operation, thereby permitting the use of a stuffing box of predetermined and unadjustable capacity and also greatly prolonging the service life of the packing rings 33.

The seat rings 47 and 60 are preferably formed of plastic or resilient material adapted to be compressed from their normal shapes, illustrated in Figs. 3 and 5, to the shapes illustrated in Figs. 2 and 4. They also serve as gaskets to seal the joint formed by the shoulder 19 and the sleeve 42. The seat rings must further have suitable physical properties for withstanding the type of service in which they are to be employed, and also suitable for use with specified temperatures, pressures, and fluid mediums to be controlled.

For example, seat rings formed of type FM-1 Nylon, manufactured by E. I. du Pont de Nemours and Co., Inc., Arlington, N. J., have been tested on hot and cold water service and within the ranges of pressures and temperatures common to household use. In a drip test conducted to determine the suitability of this type of seat ring in accordance with the above service, a valve was kept slightly opened or wire drawn over a continuous period of ninety days. At the termination of this test period, the seat ring permitted tight leakproof closing of the valve.

Tests were conducted with seat rings formed of other thermoplastics, such as Saran, manufactured by the Dow Chemical Co., Midland, Michigan, which proved to be exceptionaly serviceable for cold water service of household pressures. It is, therefore, contemplated that seat rings formed of other types of thermoplastic materials could be advantageously selected for controlling other fluid mediums of various pressures and temperatures.

Other tests were conducted with lead alloy seat rings containing antimony of from 4.0 to 7.0 per cent, and with satisfactory results. It is obvious that other lead alloys of suitable hardness may be employed.

While this invention has been shown in several forms it is obvious to those skilled in the art that it is not so limited but is susceptible of various changes and modifications without departing from the spirit thereof or the appended claims.

We claim:

1. In a stem assembly for a valve or the like including a casing, a centerpiece connected to the casing, a sleeve mounted on the inner end of said centerpiece, said centerpiece having a packing chamber formed between said sleeve and centerpiece, respective inner and outer annular shoulders formed on adjacent ends of said centerpiece and sleeve, the inner shoulders being spaced apart for determining the depth of said packing chamber, the outer shoulders of the sleeve and centerpiece being arranged in abutting relation to each other to hold said sleeve in direct contact with the said casing, and a stem mounted in said centerpiece and sleeve.

2. In a valve stem assembly of the character described, the combination including a casing, a centerpiece therefor, a stem reciprocably movable within the casing, a sleeve telescopically mounted relative to the said centerpiece, threaded means for holding the said centerpiece in predetermined axial position relative to said casing, a gasket interposed in predetermined compression between a relieved shouldered portion of the said threaded means and said casing, packing interposed in predetermined compresison between a shouldered end of the said sleeve and centerpiece and around an enlarged portion of the stem within the said casing, a seat clamped in predetermined compression between an opposite end shouldered portion of the said sleeve and a transverse surface of the said casing, the shouldered assembly of the said centerpiece and the said sleeve with the said casing providing thereby that the packing between the said sleeve and the centerpiece is compressed to said predetermined fixed compression simultaneous with effecting the fixed compression of the said seat and gasket upon axially positioning said sleeve in direct abutting contact with the said casing adjacent said seat.

3. In a stem assembly for a valve, the combination of a body with a flow passage and an annular shoulder around said flow passage, a centerpiece, a sleeve mounted to enter on the inner end of said centerpiece with an end in spaced-apart relation thereto to define therebetween a packing chamber with substantially axially aligned apertures above and below said packing chamber to form stem bearing portions, the said sleeve being recessed at its inner end to form a seat, a resilient seat ring mounted in said seat, a flange on the sleeve around the seat ring and bearing against said body annular shoulder, the said seat ring having an inside diameter substantially not less than the inside diameter of said sleeve and being wholly receivable within the recessed portion of the sleeve except for an annular lower portion thereof immediately adjacent the body flow passage, said body flow passage leading through said seat ring and sleeve, and a valve stem axially movable in said aligned apertures of said center piece and sleeve and forming therewith an aligned stem bearing assembly, the said stem having annular inclined means to engage said lower annular portion to expand the said seat ring outwardly and upwardly against the annular recessed portions of the said sleeve and against the flange in fluid sealing relation therewith while sealing an inner annular portion of the body flow passage.

4. In a valve, the combination with a valve body having a flow passage, of a stem assembly comprising a centerpiece threaded at its outer end, a sleeve engaging an inner relieved end of said centerpiece and defining with said relieved end a packing chamber therebetween, stem bearing apertures at the adjacent ends of said centerpiece and sleeve, and an axially movable stem engaging said stem bearing apertures to thereby form an axially aligned assembly, the said sleeve having an inner annular flanged end portion bearing directly against an inner annular end surface of the said body aroud the flow passage, a seat ring fixedly clamped in predetermined compression between the said inner annular flanged end portion and said annular end surface of said body adjacent the flow passage, the said seat ring when in the latter position being retained by the flanged end portion against outward expansion, the said stem having substantially conical head means for engaging and expanding a lower annular portion of the seat ring located in a plane slightly below that portion retained by the said inner flanged end portion and the body end surface around the flow passage during the closed or seated position of the valve.

5. In a valve, a body having a flow passage therethrough and an annular sealing surface adjacent thereto, a centerpiece connected to said body, a sleeve with an outer shoulder positioned on the inner end of said center piece and defining therewith an annular space to form a packing chamber therebetween and with central apertures substantially axially aligned in the sleeve and centerpiece to form stem bearing surfaces, said sleeve abutting against the body sealing surface and being recessed at its inner end to form a seat, the sleeve recess being defined by an annular surface substantially parallel to the body sealing surface and with its outer limits defined by an annular inclined surface, a seat ring with an inside diameter substantially not less than the sleeve inner diameter and being mounted between said seat and said annular sealing surface of the body adjacent the flow passage, the said seat ring being compressed to fixed predetermined thickness by compression applied in said recess in a plurality of planes whereby the said seat ring serves as a sealing gasket between said seat and said above defined surfaces of the sleeve recess, the body flow passage leading through said seat ring and sleeve, and a valve stem positioned in said center piece and sleeve aligned apertures for axial movement therewithin to allow for a lower portion thereof to bear outwardly against said seat ring adjacent said flow passage in annular inclined relation in the closed position of the valve.

EDWARD A. FREDRICKSON.
CARL BOLLING.
ROY H. ZINKIL.

REFERENCES CITED

The following references are of record in the file of this patent:

UNITED STATES PATENTS

| Number | Name | Date |
|---|---|---|
| 802,490 | Bashlin | Oct. 24, 1905 |
| 1,424,094 | Gunn | July 25, 1922 |
| 1,566,273 | Gade | Dec. 22, 1925 |
| 1,579,272 | Witherup | Apr. 6, 1926 |
| 1,582,511 | Coberly | Apr. 27, 1926 |
| 1,833,653 | Martin | Nov. 24, 1931 |
| 1,884,207 | Pollock | Oct. 25, 1932 |
| 1,988,966 | Eckhouse | Jan. 22, 1935 |
| 2,039,638 | Druge | May 5, 1936 |

FOREIGN PATENTS

| Number | Country | Date |
|---|---|---|
| 320,744 | Great Britain | of 1929 |
| 330,599 | Germany | of 1920 |
| 361,130 | Italy | of 1938 |
| 390,444 | Great Britain | of 1933 |